United States Patent Office 3,203,986
Patented Aug. 31, 1965

3,203,986
BLUENSUREA AND ITS PREPARATION
Alexander D. Argoudelis and Brian Bannister, Kalamazoo, Mich., assignors to The Upjohn Company, Kalamazoo, Mich., a corporation of Delaware
No Drawing. Original application Nov. 15, 1962, Ser. No. 238,047. Divided and this application Aug. 31, 1964, Ser. No. 393,406
3 Claims. (Cl. 260—553)

This is a division of application Serial No. 238,047, filed November 15, 1962.

This invention is related to novel compositions of matter and to a process for the preparation thereof, and is particularly directed to novel compounds derived from the antibiotic bluensin and to processes for producing the same.

More particularly, the invention relates to bluensidine, 1-deoxy-1-guanidino-3-O-carbamoyl-scyllo-inositol, a compound having the following formula:

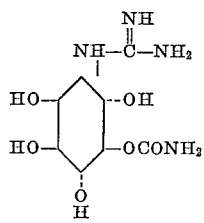

(I)

and to its preparation.

Still more particularly, the invention is directed to acylates of bluensidine having the formula:

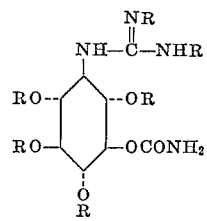

(II)

wherein R is an acyl radical selected from the group consisting of hydrocarbon acyl of from 2 to 12 carbon atoms, inclusive, and to their preparation.

Still more particularly, the invention relates to descarbamoylbluensidine, 1-deoxy-1-guanidino-scyllo-inositol, a compound having the formula:

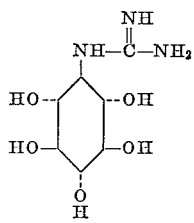

(III)

and to its preparation.

Still more particularly, the invention relates to acylates of bluensurea having the formula:

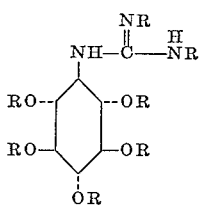

(IV)

wherein R is as defined above, and to their preparation.

Still more particularly, the invention relates to bluensurea, 1-deoxy-1-ureido-scyllo-inositol, a compound having the formula:

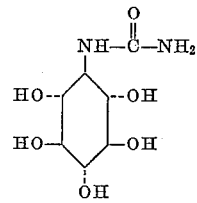

(V)

and to its preparation.

Still more particularly, the invention relates to acylates of bluensurea having the formula:

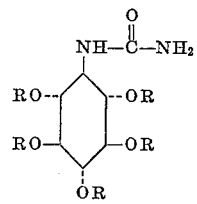

(VI)

wherein R is as defined above and to its preparation.

The starting material, bluensin, is a bio-synthetic product produced by the controlled fermentation of *Streptomyces bluensis* var. *bluensis*. The structure of bluensin is now shown to be (VIIa) or (VIIb).

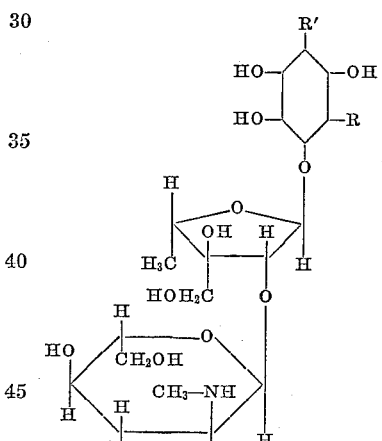

wherein (VIIa) R=OCONH$_2$;

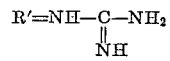

and wherein (VIIb)

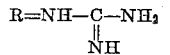

R'=OCONH$_2$. A subculture of *S. bluensis* can be obtained from the permanent collection of The Northern Utilization and Research Division, Agricultural Research Service, U.S. Department of Agriculture, Peoria, Illinois, U.S.A. Its accession number in this repository is NRRL 2876.

Bluensidine (I) is obtained by methanolysis or ethyl mercaptolysis of bluensin. The corresponding glycosides methyl dihydrostreptobiosamide and ethyl thiodihydrostreptobiosaminide are concomitantly formed. The bluensidine can be isolated as its salts by conventional means, for example, adsorption chromatography.

Bluensidine is a nitrogeneous base and as such can exist in both the protonated and nonprotonated form according to the pH of the environment. The protonated form can be isolated as acid addition salts which are useful for upgrading the free base, i.e., the nonprotonated form. Suitable acids for this purpose or hydrochloric acid, sulfuric acid, thiocyanic acid, fluosilicic acid, picric acid, Reinecke's acid, azobenzenesulfonic acid, and the like.

Bluensidine is a very strong organic base and can be used as an antacid and as the basic catalyst in base-catalyzed organic reactions, e.g., in the Knoevenagel condensation of aldehydes with reactive methylene groups. It is also useful as an intermediate. Thus, the condensation products obtained from the thiocyanic acid addition salts and formaldehyde according to U.S. Patents 2,425,320 and 2,606,155 are useful as pickling inhibitors, and the fluosilicic acid addition salts are useful as moth-proofing agents according to U.S. Patents 1,915,334 and 2,075,359.

On acylation of bluensidine, the hexaacylate (II) is obtained. Any standard acylating agent, e.g., acyl halide and anhydrides of the formula R—Hal, $R_2O$, wherein Hal is halogen, for example, chlorine, bromine, fluorine, and iodine, and R is selected from the class consisting of hydrocarbon carboxylic acid acyl of from 2 to 12 carbon atoms inclusive, can be used.

The term "hydrocarbon carboxylic acid acyl of from two to twelve carbon atoms" whenever used in the specification or claims is intended to means an acyl corresponding to a hydrocarbon carboxylic acid of from two to twelve carbon atoms, inclusive. Suitable such acids include (a) a saturated or unsaturated, straight or branched chain aliphatic carboxylic acid, for example, acetic, propionic, butyric, isobutyric, tert-butylacetic, valeric, isovaleric, caproic, caprylic, decanoic, dodecanoic, acrylic, crotonic, hexynoic, heptynoic, octynoic acids, and the like; (b) saturated or unsaturated cycloaliphatic carboxylic acid, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) a saturated or unsaturated cycloaliphatic-substituted aliphatic carboxylic acid, for example, cyclopentaneacetic acid, cyclopentanepropionic acid, cyclopenteneacetic acid, cyclohexanebutyric acid, methylcyclohexaneacetic acid, and the like; (d) an aromatic carboxylic acid, for example, benzoic acid, toluic acid, naphthoic acid, ethylbenzoic acid, isobutylbenzoic acid, methylbutylbenzoic acid, and the like; and (e) an aromatic aliphatic carboxylic acid, for example, phenylacetic acid, phenylpropionic acid, phenylvaleric acid, cinnamic acid, phenylpropiolic acid, and naphthylacetic acid, and the like.

The hexaacylates of bluensidine are useful as intermediates, for example, in the preparation of descarbamoylbluensidine and bluensurea. Further, the hexaacylates can be used to upgrade bluensidine; thus, by acylating crude bluensidine, purifying the acylate, and then converting it back to bluensidine, for example, by ammonolysis, non-acylatable and other impurities are separated.

Descarbamoylbluensidine (III) is obtained by acid hydrolysis of bluensidine or its hexaacylate. For example, on treating bluensidine or its acylate with dilute aqueous hydrochloric acid, descarbamoylbluensidine is obtained as the hydrochloride which can be recovered by crystallization or other known techniques.

Descarbamoylbluensidine is a nitrogenous base and like bluensidine can exist in both the protonated and nonprotonated form according to the pH of the environment. The protonated form can be isolated as acid addition salts which are useful for upgrading the free base, i.e., the nonprotonated form. Suitable acids for this purpose are those listed above.

Further, descarbamoylbluensidine can be used as an antacid and as the basic catalyst in base-catalyzed organic reactions, e.g., in the Knoevenagel condensation of aldehydes with reactive methylene groups. It is also useful as an intermediate. Thus, the condensation products obtained from the thiocyanic acid addition salts and formaldehyde according to U.S. Patents 2,425,320 and 2,606,155 are useful as pickling inhibitors and the fluosilicic acid addition salts are useful as mothproofing agents according to U.S. Patents 1,915,334 and 2,075,359.

On acylation of descarbamoylbluensidine, the heptaacylate (IV) is obtained. Any standarid acylating agent, e.g., acyl halides and anhydrides of the formula: R—Hal, $R_2O$, wherein Hal and R are as defined previously.

The heptaacylates of descarbamoylbluensidine are useful to upgrade descarbamoylbluensidine; thus by acylating crude descarbamoylbluensidine, purifying the acylate, and then converting it back to descarbamoylbluensidine, for example, by ammonolysis, non-acylatable and other impurities are separated.

On reacting bluensidine or its hexaacylate with an alkaline material there is obtained bluensurea (V). For example, on reacting bluensidine or hexaacetylbluensidine with saturated aqueous barium hydroxide for 1 hour there is obtained bluensurea. Other alkaline materials such as alkali metal hydroxides, for example, sodium hydroxide, potassium hydroxide, lithium hydroxide, and the like, alkaline earth metal hydroxides, for example, calcium hydroxide, and alkali metal carbonates, for example, sodium carbonate, potassium carbonate, and the like can be used. Conversion to bluensurea is also effected when bluensidine or its hexaacylate is brought into contact with or passed over a very strongly basic anion exchange resin. [Suitable anion exchange resins for this purpose are obtained by chloromethylating by the procedure given on pages 88 and 97 of Kunin, Ion Exchange Resins, 2nd Ed. (1958), John Wiley and Sons, Inc., polystyrene crosslinked, if desired, with divinylbenzene prepared by the procedure given on page 84 of Kunin, supra and quaternizing with trimethylamine or dimethylethanolamine (Dowex 2) by the procedure given on page 97 of Kunin, supra. Anion exchange resins of this type are marketed under the tradenames Dowex 2, Dowex 20, Amberlite IRA–400, Duolite A–102, and Permutit S–1.]

Bluensurea decomposes nitrous acid and, therefore, is useful when an excess of nitrous acid is to be destroyed in diazotizations. Also, bluensurea is useful as an intermediate. Thus, the condensation products obtained from the thiocyanic acid addition salts and formaldehyde according to the U.S. Patents 2,425,320 and 2,606,155 are useful as pickling inhibitors, and the fluosilicic acid addition salts are useful as mothproofing agents according to U.S. Patents 1,915,334 and 2,075,359.

On acylation of bluensurea (V) in the manner described above for bluensidine (I), the pentaacylate (VI) is obtained.

The pentaacylates of bluensurea are useful to upgrade bluensurea; thus, by acylating crude bluensurea, purifying the acylate, and then converting it back to bluensurea, for example, by ammonolysis, non-acylatable and other impurities are separated.

On reacting bluensidine (I) or its acylate (II), descarbamoylbluensidine (III) or its acylate (IV), or bluensurea (V) or its acylate (VI), with an alkaline material there is obtaned scyllo-inosamine. For example, upon reacting the above named compounds with a saturated aqueous barium hydroxide solution for 19 hours there is obtained scyllo-inosamine. Other alkaline materials listed previously can be used. As is well known in the art, scyllo-inosamine can be deaminated to myo-inositol by reacting with aqueous nitrous acid. Bluensurea likewise can be converted to myo-inositol by reacting with nitrous acid. It has been shown that animals require myo-inositol for the synthesis of phospholipids. [For a summary of the physiological activity of myo-inositol, see S. J. Angyal and L. Anderson, the "Cyclitols" in Advances in Carbohydrate Chemistry, 14, 135 (1959) and references quoted therein.] In addition, myo-inositol has been shown to increase the yield of streptomycin when added to growing cultures of *Streptomyces griseus*

[S. K. Majundar and A. J. Kutzner, Science, 135, 734 (1962)].

The following examples are illustrative of the process and products of the present invention, but are not to be construed as limiting. All percentages are by weight and all solid mixture proportions are by volume unless otherwise noted.

PREPARATION OF BLUENSIN

Fermentation

A soil stock of *Streptomyces bluensis* var. *bluensis* NRRL 2876, was used to inoculate 100 ml. of sterile medium in a 500 ml. flask. The medium was of the following composition:

| | G. |
|---|---|
| Glucose monohydrate | 10 |
| Yeastolac* | 10 |
| NZ amine B** | 5 |
| Water to make 1 liter. | |

(pH adjusted to 7.0 prior to sterilization)

*Autolyzed brewer's yeast with milk solids added.
**A pancreatic digest of casein.

The medium was incubated for 2 days at 28° C. on a reciprocating shaker. A culture medium thus obtained was used to inoculate 20 liters of sterile seed medium contained in a 30 liter stainless steel tank. The medium was of the following composition.

| | G. |
|---|---|
| Wilson's Peptone No. 159* | 10 |
| Corn steep liquor | 10 |
| Refined cottonseed meal | 2 |
| Glucose monohydrate | 10 |
| Water to make 1 liter. | |

(pH adjusted to 7 prior to sterilization)

*An enzymatic hydrolysate of proteins of animal origin, protein content approximately 57 percent.

The tank medium was incubated at 28° C. for 1 day and the contents were stirred continually with sparged air at the rate of 10 liters of air per minute. Twelve liters of the resulting seed growth medium was used to inoculate 250 liters of sterile fermentation medium contained in a 100 gallon stainless steel fermenter. The medium was of the following composition:

| | G. |
|---|---|
| Glucose monohydrate | 10 |
| Black strap molasses | 30 |
| Brewer's yeast | 5 |
| Corn steep liquor | 20 |
| Water to make 1 liter. | |

(pH adjusted to 7.2 prior to sterilization)

The fermenter medium was incubated at 28 C., sparged with air at the rate of 100 liters of air per minute, and agitated by an impeller at 280 r.p.m. The beer was harvested after 88 hours of fermentation.

Isolation

Sufficient whole beer was produced in the manner as described above to yield 5350 liters at pH 8.2. The whole beer was treated with 16 kg. of oxalic acid, adjusted to pH 2.9 with 1 N sulfuric acid, and filtered using about 160 kg. of diatomite and about 500 liters of wash water. The filtered beer, now about 5400 liters, was adjusted to pH 7.8–8.0 with 10 percent aqueous sodium hydroxide and polished by filtering through a diatomite precoated filter press. The filtered beer (5300 liters) was passed downflow through two resin columns in series. Each column was 14 inches in diameter and was charged with 4.5 cubic feet of Amberlite IRC–50 in the sodium cycle. [A cation exchange resin of the carboxylic type obtained by the copolymerization of acrylic acid and divinylbenzene by the procedure given on page 87 of Kunin, Ion Exchange Resins, 2nd Ed. (1958), John Wiley and Sons, Inc.] The beer was passed through the columns at the rate of about 19 liters per minute. The spent beer was discarded and the columns were washed with deionized water. The resin columns were then individually eluted with water acidified to pH 1.2–1.5 with 1 N sulfuric acid. Each column was eluted 4 times with 100 liters each time. The lead and trail column eluates were individually pooled, concentrated to about 200 liters each, and each pool was adjusted to pH 6.5 with 10 percent aqueous sodium hydroxide. Activated carbon was added to each of the eluate concentrates to make a slurry, 1200 g. and 850 g. being used for the lead and trail columns, respectively, the amount of carbon being dependent upon the solids in the concentration (1 g. of carbon for each g. of solids). After mixing each slurry well, the carbon of each was recovered by filtration and each cake was washed three times, using about 10 liters of water for each wash. Each cake was then eluted with about 200 liters each of 15 percent aqueous acetone.

The aqueous acetone eluate from the lead column amounted to 187 liters and on concentration and freeze drying yielded 1034 g. of bluensin, Preparation 4A. The aqueous acetone eluate from the trail column amounted to 190 liters and on concentration and freeze drying yielded 777 g. of bluensin, Preparation 4B. Preparations 4A and 4B were combined with similar material to produce Preparation 4C which was further purified by chromatography.

ADSORPTION CHROMATOGRAPHY

A carbon column was prepared in the following manner. A mixture of 16.5 kilograms each of activated carbon and diatomite was wet mixed for 1 hour with 120 liters of deionized water adjusted to pH 3.5 with 1 N sulfuric acid. The slurry was poured into a 14 in. column on top of a layer of sea sand and cotton and packed by nitrogen at a pressure of 10 to 15 pounds. A layer of sea sand was added to the top of the column. The column was four feet tall and comprised a liquid holdup of 155 liters. The feed was 2707 g. of Preparation 4C. The feed was dissolved in 6.6 liters of deionized water and adjusted to pH 3.5 with 1 N sulfuric acid. Diatomite was added, sufficient to make a thick paste, and this thick paste was placed on top of the column. The column was washed with 150 liters of deionized water and then eluted with 300 liters of 10 percent aqueous acetone. Both wash and elution rates were about 410 ml. per minute. The following eluate pools were made:

| Liters of aqueous acetone eluate | Pool, No. | Solids, mg./ml. |
|---|---|---|
| 0–5 liters | 1 | 6 |
| 6–35 | 2 | 5 |
| 36–77 | 2a | 5 |
| 78–100 | 3 | 7 |
| 101–127 | 4 | 27 |
| 128–145 | 5 | 7 |
| 146–177 | 6 | 2 |
| 178–end | Discarded | |

The activity closely follows the solids content of each pool. The greatest amount of activity was found in pool No. 4 (K=0.38), which on drying yielded 640 g. of bluensin, Preparation 5A.

Preparation 5A was reslurried in 670 ml. of deionized water, the mixture was heated to 45° C. and then filtered with the aid of diatomite. The filtrate was diluted with 2.5 liters of water and freeze-dried to form a cake. The cake was slurried in 1 liter of deionized water at 35° C. and then freeze-dried to produce 490 g. of essentially pure bluensin sulfate, Preparation 5B.

CHARACTERIZATION

Preparation 5B was characterized as follows:
*Infrared absorption:* (in mineral oil mull) The infrared spectrum shows characteristic absorption, expressed in reciprocal centimeters, at the following frequencies:

3350–2950, 1695, 1655, 1610, 1140–960, 850, 760

*Ultraviolet absorption:* (in water) The ultraviolet spectrum shows no absorption maxima between 232 and 400 mu.

*Elemental analysis:*
Found: C, 34.88; H, 5.63; N, 10.07; O, 45.01; S, 4.59.

*Paper chromatography:* Bluensin shows the following Rf ranges—

| Solvent system: | Rf range |
|---|---|
| 1. 1-butanol:water (84:16) | 0.0–0.15 |
| 2. 1-butanol:water (84:16) plus 0.25 percent p-toluenesulfonic acid | 0.0–0.15 |
| 3. 1-butanol:acetic acid:water (2:1:1) | 0.05–0.25 |
| 4. 1-butanol:water (84:16) plus 2 percent piperidine | 0.0–0.15 |
| 5. 1-butanol:water (96.4) | 0.2–0.9 |
| 6. 1-butanol:water (96.4) plus 0.25 percent p-toluenesulfonic acid | 0.05–0.25 |
| 7. 1-butanol:water (84:16) plus 2 percent p-toluenesulfonic acid | 0.05–0.25 |
| 8. methanol:water containing 3 percent NaCl (80:20) | 0.4–0.65 |

*Equivalent weight:* 657
*pKa':* Sulfate salt (in water) 7.6
*Specific rotation:* $[\alpha]_D^{25} = -87°$ (in water)

*Spot tests:*
Sakaguchi—positive
Maltol—negative
Ninhydrin—negative
Biuret—negative
Polypeptide *—negative

*Ninhydrin on acid hydrolysate.

*Solubility.*—Bluensin is soluble in water to the extent of more than 500 and less than 1000 mg./ml. The compound is soluble in the following solvents to an extent of less than 1 mg./ml.: pyridine, chloroform, 90 percent ethanol, ethyl acetate, cyclohexane, benzene, acetone dimethylformamide and dioxane.

*Purity.*—The compound, Preparation 5B, was found to be 98.2±0.8 percent pure by phase solubility analysis in a mixture of 70 percent acetone and 30 percent water by volume.

PREPARATION OF BLUENSIN DIHYDROCHLORIDE

Bluensin sulfate (100 g.) was dissolved in 800 ml. of water. The pH of the solution was adjusted to 4.5 with 1 N aqueous hydrochloric acid. This solution was passed through a resin column containing one kg. of Dowex 2, an anion exchange resin formed by chloromethylating divinylbenzene (8 percent crosslinked) and quaternizing with dimethylethanolamine. The resin was in the chloride ion form. The column was washed with water. The eluate (1200 ml.) was freeze-dried to 84.4 g. of bluensin dihydrochloride.

EXAMPLE 1.—BLUENSIDINE

*A. Methanolysis of bluensin hydrochloride and isolation of bluensidine carbonate.*—Bluensin dihydrochloride (18.3 g.) was dissolved in 600 ml. of 1 N methanolic hydrogen chloride solution. The solution was allowed to stand at room temperature for 48 hours. Silver carbonate (113 g.) was added under vigorous stirring. Insoluble silver carbonate and silver chloride were separated by filtration and the filtrate was concentrated to dryness. The residue was used for a carbon chromatographic column which was prepared as follows: 200 grams of activated carbon and 300 grams of diatomite were stirred with 3000 ml. of water. The mixture was poured into a glass column (2 in. inside diameter). The column was packed under pressure of 2 lbs. per sq. inch until a constant height was obtained. It was then washed with 2 hold-up volumes of water (hold-up volume=1200 ml.). Sea sand was added on the top of the carbon bed. The residue obtained from the methanolysis, described above, was dissolved in 100 ml. of water and then added at the top of the column. The column was then eluted with water and fractions of 20 ml. each were collected. The first 59 fractions were discarded. Every fifth fraction was then analyzed by solids determination with the following results:

| Fraction No.: | Solids (mg./2 ml.) |
|---|---|
| 60 | 0.31 |
| 65 | 0.40 |
| 70 | 0.32 |
| 75 | 0.45 |
| 80 | 5.68 |
| 85 | 24.98 |
| 90 | 24.79 |
| 95 | 15.04 |
| 100 | 10.61 |
| 105 | 8.03 |
| 110 | 6.56 |
| 115 | 5.19 |
| 120 | 4.09 |
| 125 | 3.23 |

Pools of the above fractions were made and freeze-dried to give the following bluensidine carbonate preparations:

Pool 1 Fractions 75–85 (0.94 g.)
Pool 2 Fractions 86–105 (3.59 g.)
Pool 3 Fractions 106–124 (0.97 g.)

All three preparations had identical infrared spectra, which showed absorption bands (in mineral oil mull) at 3450–3300 cm.$^{-1}$ (OH, NH), broad band at 2000 cm.$^{-1}$ (CO$_3$=), 1710, 1667, 1639 cm.$^{-1}$.

*B. Methanolysis of bluensin dihydrochloride and isolation of bluensidine hydrochloride.*—Bluensin dihydrochloride (80 g.) was dissolved in 2400 ml. of a methanolic hydrochloric acid asolution prepared by mixing acetyl chloride and methanol (79:921 v./v.). The solution was allowed to stand at room temperature for 48 hr., and then was mixed with 7200 ml. of ethyl ether. A precipitate formed and was allowed to settle at room temperature for 12 hr. The supernatant was then decanted. The precipitate was washed with ether, isolated by filtration and dried; yield 60 g. This material was used as a feed for a carbon chromatographic column which was prepared as follows: 300 g. of activated carbon and 600 g. of diatomite were stirred with 4000 ml. of water. The mixture was poured into a glass column (2 in. inside diameter). The column was packed under a pressure of 2 lb. per sq. in. until a constant height was obtained. It was then washed with 2 holdup volumes of water. Sea sand was added at the top of the carbon bed. The feed material was dissolved in 100 ml. of water and added at the top of the column. The column was then eltued with water and fractions of 20 ml. each were collected. The first 100 fractions were discarded. Every fifth fraction was then analyzed by solids determination with the following results:

| Fraction No.: | Solids (mg./2 ml.) |
|---|---|
| 105 | 0.55 |
| 110 | 3.53 |
| 115 | 5.23 |
| 120 | 5.70 |
| 125 | 58.05 |
| 130 | 72.20 |
| 135 | 46.63 |
| 140 | 29.48 |
| 145 | 18.82 |
| 150 | 12.48 |
| 155 | 8.83 |

| Fraction No.: | Solids (mg./2 ml.) |
|---|---|
| 160 | 6.57 |
| 165 | 5.06 |
| 170 | 4.01 |
| 175 | 2.85 |
| 180 | 2.34 |
| 185 | 2.02 |
| 190 | — |
| 195 | 2.43 |
| 200 | 1.87 |
| 205 | — |
| 210 | 1.30 |
| 215 | 1.10 |
| 220 | 0.97 |
| 225 | 0.74 |
| 230 | — |
| 235 | 0.71 |
| 240 | 0.65 |
| 245 | 0.75 |
| 250 | 0.82 |
| 255 | 0.72 |
| 260 | 0.70 |
| 265 | 0.60 |
| 270 | 0.63 |
| 275 | 0.68 |
| 280 | 0.50 |
| 285 | 0.56 |
| 290 | 0.54 |
| 295 | 0.56 |
| 300 | 0.57 |
| 305 | 0.54 |
| 310 | 0.57 |

Pools of the above fractions were freeze-dried to yield the following bluensidine hydrochloride preparations:

| Pool No.: | Fraction No. |
|---|---|
| 1 | 120–125 (1.78 g.) |
| 2 | 126–130 (3.87 g.) |
| 3 | 131–135 (3.10 g.) |
| 4 | 136–145 (2.80 g.) |
| 5 | 146–189 (2.55 g.) |

The above 5 pools were dissolved in methanol, and the methanolic solution was added to 300 ml. of ether. Precipitated materials were separated by filtration and dried to give bluensidine hydrochloride Preparations 1, 2, 3, 4, and 5 which had the following physical and chemical characteristics:

*Infrared spectra:* The infrared spectra of preparations 1 thru 5 were found to be identical as follows: 3330 (s), 3200 (s), 2940 (oil), 2915 (oil), 2845 (oil), 1710 (s), 1670 (s), 1625 (s), 1458 (oil), 1373 (oil), 1350 (s), 1215 (m), 1107 (s), 1060 (m), 1033 (m), 1007 (s), 967 (w), 920 (w), 775 (m), 718 (oil), cm.$^{-1}$.

*U.V. spectra:* Preparations 1 thru 5 did not show any absorption maximum between 220 and 400 m$\mu$.

Optical rotation:

| Prep. No. | $[\alpha]_D^{25}$ |
|---|---|
| 1 | +9.0° |
| 2 | +1.8° |
| 3 | +1.5° |
| 4 | +0.4° |
| 5 | +0.5° |

NOTE: c.=1 (water).

*Elemental analysis:*
Calculated for $C_8H_{18}N_4O_6 \cdot HCl$: C, 31.92; H, 5.69; N, 18.62; Cl, 11.78. Found: Preparation No. 3—C, 31.64; H, 5.81; N, 17.60; Cl, 11.94. Preparation No. 4—C, 32.10; H, 5.67; N, 17.36; Cl, 11.63.

EXAMPLE 2.—HEXAACETYLBLUENSIDINE

Bluensidine carbonate (2.27 g.) was stirred at room temperature for 18 hours with pyridine (100 ml.) and acetic anhydride (50 cc.). The solid dissolved during the first few hours of the acetylation. The resulting pale yellow solution was taken to dryness on a rotating evaporator at 30° C. under 15 mm. pressure and then at 4 mm. The glassy residue which remained was dissolved in methylene chloride, washed with water, twice with dilute hydrochloric acid (N/2), water, saturated aqueous sodium bicarbonate, and twice again with water. Removal of the solvent, after drying over anhydrous sodium sulfate, on a rotating evaporator at 40°/15 mm. gave a pale yellow viscous oil (2.58 g.) which crystallized on treatment with ethyl acetate; crystals melted at 245–248° C. Recrystallization from ethyl acetate-Skellysolve B (isomeric hexanes) gave small colorless prisms of hexaacetylbluensidine having an M.P. 249–251° C., and 250–251° C. on a second recrystallization.

*Elemental analysis.*—Calculated for $C_{20}H_{28}O_{12}N_4$: C, 46.51; H, 5.46; N, 10.85; acetyl, 49.99, mol. wt. 516. Found: C, 46.73; H, 5.61; N, 11.13; acetyl, 50.15, mol wt. 494 (osmometric, in $CHCl_3$).

Hexaacetylbluensidine (300 mg.) was added at 0° C. to methanol (100 cc., saturated with dry ammonia at 0° C.), and the colorless solution left overnight. Removal of the solvent in vacuo gave a colorless mixture of amorphous and crystalline material which was dissolved in methanolic hydrogen chloride (8 ml. of N). Ether was added carefully until no further precipitation occurred. On decantation, washing with ether, and drying at room temperature, 124 mg. of bluensidine hydrochloride was obtained.

EXAMPLE 3.—DESCARBAMOYLBLUENSIDINE HYDROCHLORIDE

Bluensidine hydrochloride (one gram) was dissolved in 100 ml. of 1.5 N aqueous hydrochloric acid. The solution was kept under reflux for 15.5 hours; it was then cooled and concentrated to dryness under reduced pressure. The resulting residue was dissolved in 50 percent aqueous methanol (10 ml.), and acetone was added until the solution became cloudy. Upon permitting the solution to stand at room temperature for 2 hrs., crystalline descarbamoylbluensidine hydrochloride precipitated. The crystals were isolated by filtration and dried; yield 500 mg. An additional 150 mg. of crystals were isolated from the mother liquors. A total of 2.5 mmoles of guanidinoinositol hydrochloride was isolated from 3.3 mmoles of bluensidine hydrochloride or 0.76 mole of descarbamoylbluensidine hydrochloride per mole of starting material. Recrystallization of the above crystals gave descarbamoylbluensidine hydrochloride crystals which had the following chemical and physical properties:

*Appearance:* Colorless needles
*Melting point:* 228–230° C. (decomposition)
*Optical rotation:* $[\alpha]_D^{25}=0$ (c.=1, water)
*I.R. spectrum:* 3435 (s), 3370 (s), 3335 (s), 3270 (s), 3180 (s), 2940 (oil), 2918 (oil), 2840 (oil), 1665 (s), 1623 (s), 1573 (w), 1458 (oil), 1373 (oil), 1365 (m), 1347 (w), 1328 (m), 1312 (w), 1290 (m), 1273 (m), 1320 (m), 1220 (w), 1167 (w), 1132 (w), 1113 (s), 1100 (s), 1072 (m), 1062 (m), 1045 (w), 1010 (s), 995 (s), 963 (w), 708 (m), cm.$^{-1}$.

Band intensities are indicated as "s," "m," and "w," respectively, and are approximated in terms of the background in the vicinity of the bands. An "s" band is of the same order of intensity as the strongest band in the spectrum; "m" bands are between one-third and two-thirds as intense as the strongest band and "w" bands are less than one-third as intense as the strongest band. These estimates are made on the basis of a percent transmission scale.

*U.V. spectrum:* No maximum between 220–400 m$\mu$.
*Elemental analysis:*
Calculated for $C_7H_{15}N_3O_5 \cdot HCl$: C, 32.59; H, 6.25; N, 16.29; O, 31.01; Cl, 13.74; eq. wt. 257.5. Found: C, 32.92; H, 5.95; N, 15.37; O, 31.53; Cl, 13.99; eq. wt. 260.

On reacting descarbamoylbluensidine with acetic anhydride and pyridine as in Example 2 there is obtained heptaacetyldescarbamoylbluensidine.

EXAMPLE 4.—BLUENSUREA

Bluensidine (3 grams) was dissolved in 150 ml. of a saturated aqueous barium hydroxide solution. A precipitate of barium carbonate formed almost immediately. The solution was kept under reflux for 1 hour. Excess barium hydroxide was precipitated as barium carbonate by passing carbon dioxide through the reaction mixture. The precipitated barium carbonate was removed by filtration and the filtrate was freeze-dried to give 2.95 g. of a colorless amorphous material. Crystallization from 50 percent aqueous methanol-acetone afforded 1.2 g. of bluensurea as a colorless crystalline material having the following physical and chemical properties:

*Appearance:* Colorless irregular plates
*Melting point:* 244–245° C. with decomposition.
*Optical rotation:* $[\alpha]_D^{25}=0$ (c.=1, water)
*Infrared spectrum:* 3460 (s), 3390 (s), 3360 (s), 3310 (s), 3190 (s), 2940 (oil), 2920 (oil), 2845 (oil), 1680 (s), 1640 (m), 1620 (s), 1597 (m), 1550 (s), 1480 (m), 1460 (oil), 1375 (oil), 1327 (m), 1277 (m), 1255 (w), 1235 (w), 1218 (w), 1170 (m), 1123 (m), 1097 (s), 1055 (m), 1007 (s), 995 (s), 773 (w), cm.$^{-1}$.
*U.V. spectrum:* No maximum between 220–400 m$\mu$
*Elemental analysis:*
 Calculated for $C_7H_{14}N_2O_6$: C, 37.87; H, 6.36; N, 12.62; O, 43.24. Found: C, 37.90; H, 6.21; N, 11.96; O, 43.99.
*Potentiometric titration:* No titrable group.

On reacting bluensurea with acetic anhydride and pyridine as in Example 2 there is obtained pentaacetylbluensurea.

EXAMPLE 5.—PREPARATION OF SCYLLO-INOSAMINE HYDROCHLORIDE

Bluensidine hydrochloride (3 grams) was dissolved in 300 ml. of saturated aqeuous barium hydroxide solution. The solution was kept under reflux for 19 hours after which it was cooled. Precipitated barium carbonate was separated by filtration. The filtrate was saturated with carbon dioxide and the precipitated barium carbonate was again separated by filtration. The filtrate was freeze-dried to give 2.43 g. of a colorless amorphous solid. 500 mg. of this material was dissolved in 50 ml. of a solution of 0.2 N methanolic hydrochloric acid and 5 ml. of water. Upon the addition of acetone, colorless scyllo-inosamine hydrochloride crystals precipitated. These crystals were filtered off, washed with acetone and dried; yield 375 mg.

Recrystallization of these crystals from water-ethanol-acetone (1:1:1) gave 60 mg. of colorless irregular plates which darken at approximately 260° C. and do not melt below 300° C. and having the following:

*Elemental analysis:*
 Calculated for $C_6H_{14}NO_5Cl$: C, 33.52; H, 6.56; N, 6.52; Cl, 16.42. Found: C, 33.54; H, 6.65; N, 6.81; Cl, 15.21.

EXAMPLE 6.—PREPARATION OF MYO-INOSITOL HEXAACETATE

Scyllo-inosamine hydrochloride (700 mg.) was dissolved in 10.5 ml. of water and 1.4 ml. of acetic acid. This solution was mixed with a solution of 1.75 g. of barium nitrite in 8.75 ml. of water. The mixture was allowed to stand at 5° C. for 21 hours. Sulfuric acid (2 N) was then added, and the precipitated barium sulfate was separated by filtration. The filtrate was concentrated in vacuo to a volume of 5 ml. myo-inositol as a colorless crystalline material, then precipitated. The crystals were dissolved in 30 ml. acetic anhydride, mixed with 50 mg. of sodium acetate and the mixture was kept under reflux for 30 min. The mixture was added to 400 ml. of water, and the aqueous solution was extracted 3 times with 200 ml. of chloroform. Concentration of the chloroform extract afforded myo-inositol hexaacetate as a crystalline material which was recrystallized from ethanol-water, and which had a melting point of 215–218° C. (reported for myo-inositol hexaacetate 216–217° C.).

EXAMPLE 7

By substituting the acetic anhydride and pyridine in Example 2 by acetyl chloride, propionyl bromide, butyryl chloride, valeryl chloride, caproyl chloride, heptanoyl chloride, and caprylyl chloride and at least a stoichiometric amount of triethylamine there are obtained the corresponding hexaacetyl-, hexapropionyl-, hexabutyryl-, hexavaleryl-, hexacaproyl-, hexaheptanoyl-, and hexacaprylylbluensidine.

EXAMPLE 8

By substituting the acetic anhydride in Example 2 by propionic, succinic, maleic, and phthalic anhydride, there are obtained the corresponding hexapropionyl-, hexasuccinyl-, hexamaleyl-, and hexaphthaloylbluensidine.

EXAMPLE 9

By substituting the bluensidine hydrochloride in Example 5 by hexaacylbluensidine hydrochloride there is obtained scyllo-inosamine hydrochloride.

EXAMPLE 10

By substituting the bluensidine hydrochloride in Example 5 by descarbamoylbluensidine or heptaacyldescarbamoylbuensidine hydrochloride there is obtained scyllo-inosamine hydrochloride.

EXAMPLE 11

By substituting the scyllo-inosamine hydrochloride in Example 6 by bluensurea there is obtained myo-inositol hexaacetate.

We claim:
1. Bluensurea, a compound having the structural formula:

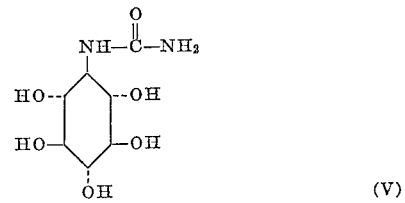

2. A process for making bluensurea which comprises reacting bluensidine with an alkaline material selected from the group consisting of alkali metal hydroxides, alkaline earth metal hydroxides, alkali metal carbonates, and strongly basic anion exchange resins to produce bluensurea.

3. A process for making bluensurea which comprises reacting bluensidine with barium hydroxide to produce bluensurea.

No references cited.

NICHOLAS S. RIZZO, *Primary Examiner.*

UNITED STATES PATENT OFFICE
CERTIFICATE OF CORRECTION

Patent No. 3,203,986            August 31, 19

Alexander D. Argoudelis et al.

It is hereby certified that error appears in the above numbered patent requiring correction and that the said Letters Patent should read as corrected below.

Column 1, line 61, for "bluensurea" read -- descarbamoy bluensidine --; column 2, line 68, for "nitrogeneous" read - nitrogenous --; column 3, line 2, for "or" read -- are --; column 4, line 6, for "standarid" read -- standard --; colum: 8, line 37, after "1639" insert -- , 1600 --; line 42, for "asolution" read -- solution --.

Signed and sealed this 5th day of April 1966.

(SEAL)
Attest:

ERNEST W. SWIDER            EDWARD J. BRENNER
Attesting Officer            Commissioner of Patents